(12) United States Patent
Kobayashi

(10) Patent No.: US 9,876,924 B2
(45) Date of Patent: Jan. 23, 2018

(54) IMAGE READING DEVICE AND IMAGE FORMING APPARATUS FOR DETERMINING A WIDTH OF A DOCUMENT

(71) Applicant: FUJI XEROX CO., LTD., Tokyo (JP)

(72) Inventor: Ken Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/049,556

(22) Filed: Feb. 22, 2016

(65) Prior Publication Data

US 2017/0094087 A1    Mar. 30, 2017

(30) Foreign Application Priority Data

Sep. 28, 2015 (JP) ................................. 2015-189731

(51) Int. Cl.
*H04N 1/00* (2006.01)

(52) U.S. Cl.
CPC ....... *H04N 1/00737* (2013.01); *H04N 1/0071* (2013.01); *H04N 1/00713* (2013.01); *H04N 2201/0094* (2013.01)

(58) Field of Classification Search
None
See application file for complete search history.

(56) References Cited

U.S. PATENT DOCUMENTS

| 2008/0297854 A1* | 12/2008 | Oteki ........................ H04N 1/40 358/471 |
| 2011/0013240 A1* | 1/2011 | Kobayashi ............... B65H 7/02 358/498 |

FOREIGN PATENT DOCUMENTS

| GB | 2075721 A | * 11/1981 | ............ G03D 3/065 |
| JP | 62-61467 A | 3/1987 | |
| JP | 2002-165072 A | 6/2002 | |
| JP | 2012-39316 A | 2/2012 | |
| JP | 5522292 B2 | 6/2014 | |

* cited by examiner

*Primary Examiner* — Barbara Reiner
(74) *Attorney, Agent, or Firm* — Sughrue Mion, PLLC

(57) ABSTRACT

An image reading device includes an accommodation section, an aligning member, a reading member, and a width detector. The accommodation section accommodates at least one document. The aligning member is provided in the accommodation section, is supported in a movable manner in a width direction intersecting a transport direction of the document, and aligns a widthwise edge of the document. The reading member reads an image of the document passing through a read position preset in a transport path. The width detector detects a width of the document based on a widthwise position of the aligning member if the document is of a typical size, and detects the width of the document based on the image read by the reading member if the document is of an atypical size.

3 Claims, 8 Drawing Sheets

| WIDTH DETECTION METHOD | TYPICAL SIZE | | ATYPICAL SIZE | |
|---|---|---|---|---|
| | NON-MIXED | MIXED | NON-MIXED | MIXED |
| RATE-PRIORITIZED MODE | SIDE GUIDE | READ IMAGE | READ IMAGE | READ IMAGE |
| ACCURACY-PRIORITIZED MODE | READ IMAGE | READ IMAGE | READ IMAGE | READ IMAGE |

FIG. 6

| WIDTH DETECTION METHOD | TYPICAL SIZE | | ATYPICAL SIZE | |
|---|---|---|---|---|
| | NON-MIXED | MIXED | NON-MIXED | MIXED |
| RATE-PRIORITIZED MODE | SIDE GUIDE | READ IMAGE | READ IMAGE | READ IMAGE |
| ACCURACY-PRIORITIZED MODE | READ IMAGE | READ IMAGE | READ IMAGE | READ IMAGE |

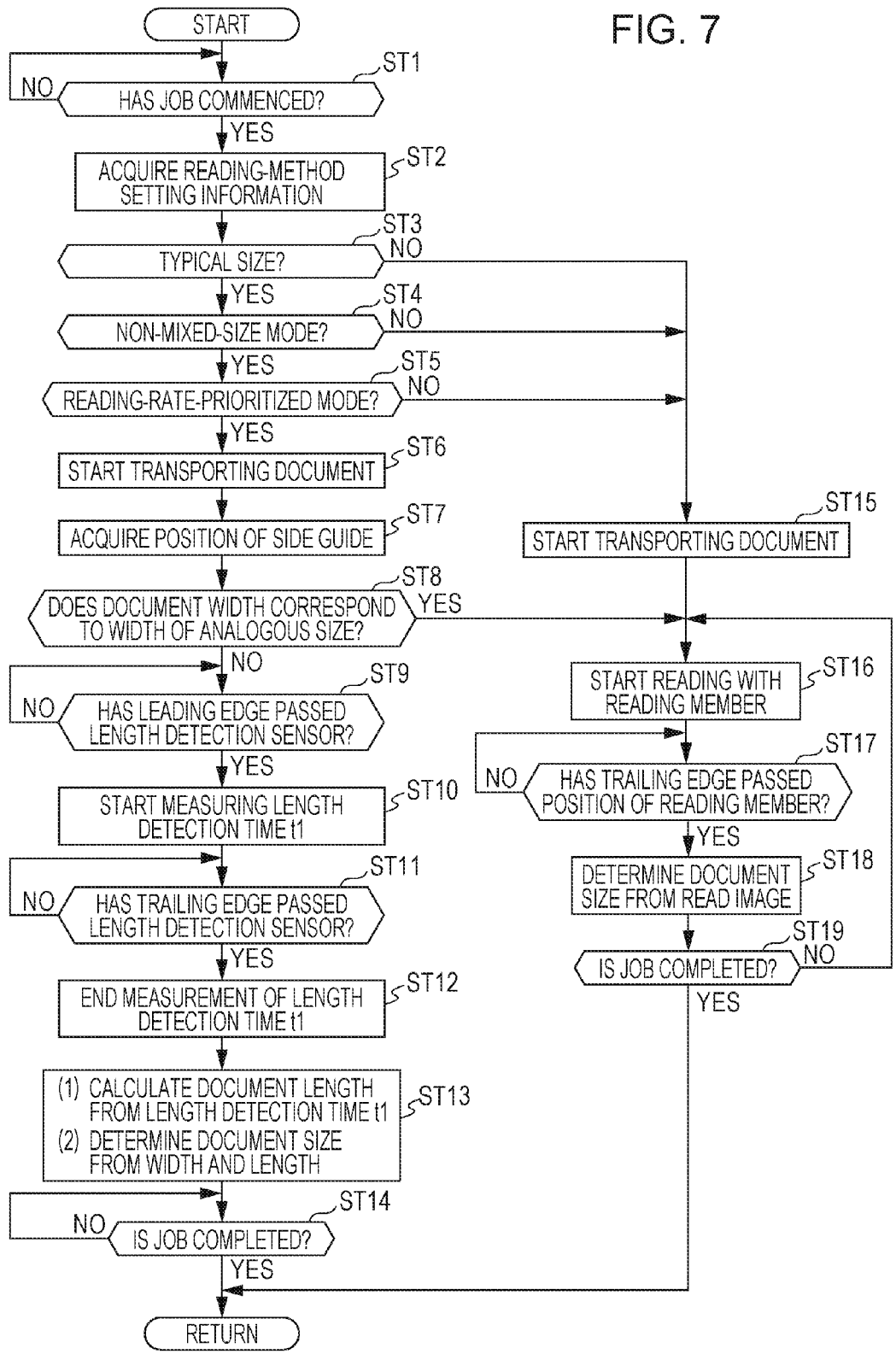

FIG. 8A

| TYPICAL SIZE | ATYPICAL SIZE |
|---|---|
| SIDE GUIDE + SENSOR PASSING TIME | READ IMAGE |

FIG. 8B

| NON-MIXED | MIXED |
|---|---|
| SIDE GUIDE + SENSOR PASSING TIME | READ IMAGE |

FIG. 8C

| RATE-PRIORITIZED MODE | ACCURACY-PRIORITIZED MODE |
|---|---|
| SIDE GUIDE + SENSOR PASSING TIME | READ IMAGE | ably embodiment, FIG. 8A illustrating a model that only has typical-size and atypical-size setting options, FIG. 8B illustrating a model that only has non-mixed-size and mixed-size setting options, FIG. 8C illustrating a model that only

IMAGE READING DEVICE AND IMAGE FORMING APPARATUS FOR DETERMINING A WIDTH OF A DOCUMENT

CROSS-REFERENCE TO RELATED APPLICATIONS

This application is based on and claims priority under 35 USC 119 from Japanese Patent Application No. 2015-189731 filed Sep. 28, 2015.

BACKGROUND

Technical Field

The present invention relates to image reading devices and image forming apparatuses.

SUMMARY

According to an aspect of the invention, there is provided an image reading device including an accommodation section (e.g., a document feed tray), an aligning member, a reading member, an input section, and a width detector. The accommodation section accommodates at least one document. The aligning member is provided in the accommodation section, is supported in a movable manner in a width direction intersecting a transport direction of the document, and aligns a widthwise edge of the document. The reading member reads an image of the document passing through a read position preset in a transport path. A document reading method is input to the input section. In accordance with the document reading method input from the input section, the width detector detects a width of the document based on a widthwise position of the aligning member if the document is of a typical size, and detects the width of the document based on the image read by the reading member if the document is of an atypical size.

BRIEF DESCRIPTION OF THE DRAWINGS

An exemplary embodiment of the present invention will be described in detail based on the following figures, wherein:

FIG. 6 illustrates a list of document-size detection methods according to the first exemplary embodiment;

FIG. 7 is a flowchart of a document-reading control process according to the first exemplary embodiment; and FIGS. 8A to 8C illustrate modifications of the first exemplary embodiment, FIG. 8A illustrating a model that only has typical-size and atypical-size setting options, FIG. 8B illustrating a model that only has non-mixed-size and mixed-size setting options, FIG. 8C illustrating a model that only has reading-rate-prioritized-mode and reading-accuracy-prioritized-mode setting options.

DETAILED DESCRIPTION

Figure 1:
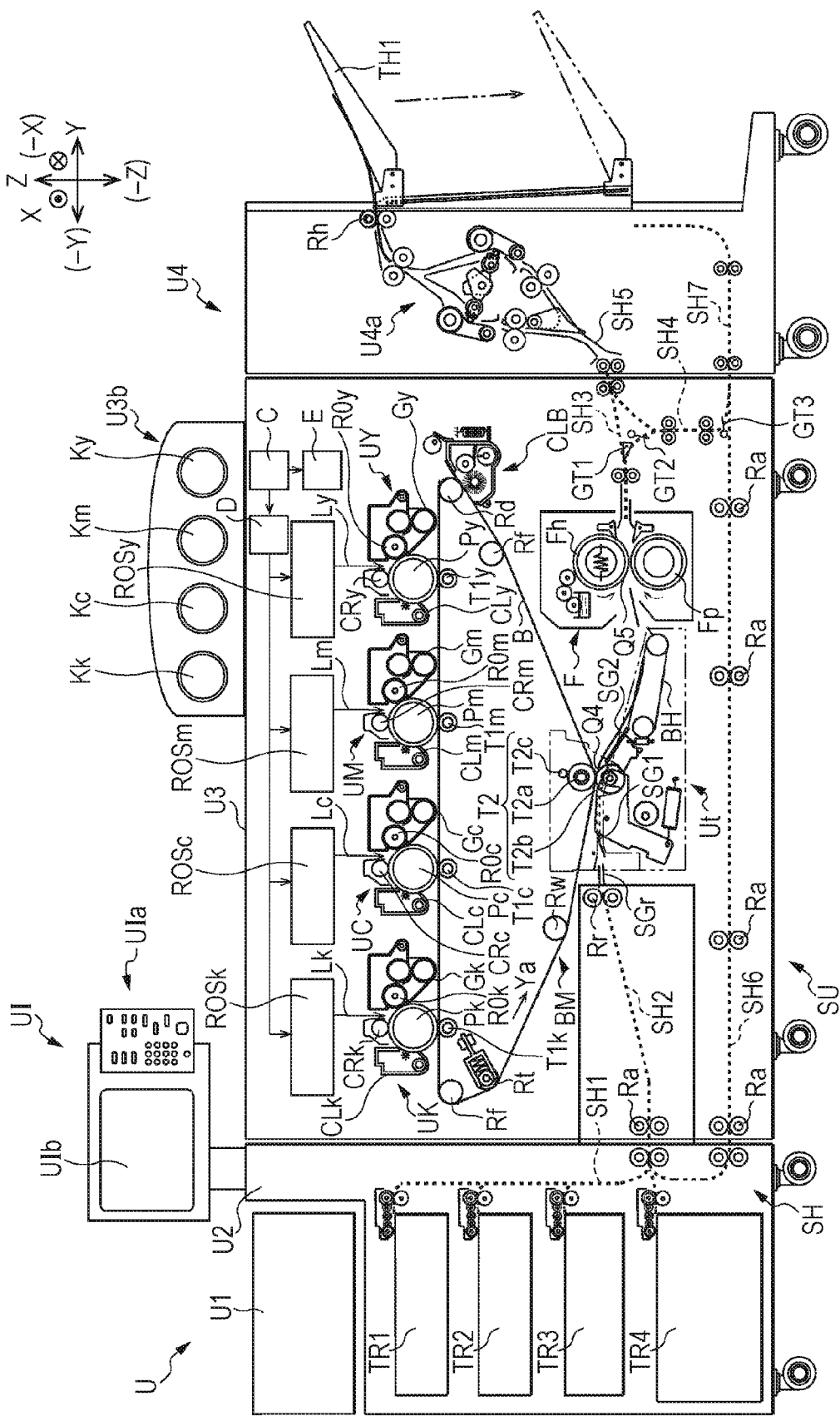
FIG. 1 is an overall view of an image forming apparatus according to a first exemplary embodiment.

Although a specific exemplary embodiment of the present invention will be described below with reference to the drawings, the present invention is not to be limited to the following exemplary embodiment.

In order to provide an easier understanding of the following description, the front-rear direction will be defined as "X-axis direction" in the drawings, the left-right direction will be defined as "Y-axis direction", and the up-down direction will be defined as "Z-axis direction". Moreover, the directions or the sides indicated by arrows X, −X, Y, −Y, Z, and −Z are defined as forward, rearward, rightward, leftward, upward, and downward directions, respectively, or as front, rear, right, left, upper, and lower sides, respectively.

Furthermore, in each of the drawings, a circle with a dot in the center indicates an arrow extending from the far side toward the near side of the plane of the drawing, and a circle with an "x" therein indicates an arrow extending from the near side toward the far side of the plane of the drawing.

In the drawings used for explaining the following description, components other than those for providing an easier understanding of the description are omitted where appropriate.

First Exemplary Embodiment

FIG. 1 is an overall view of an image forming apparatus according to a first exemplary embodiment.

Figure 2:
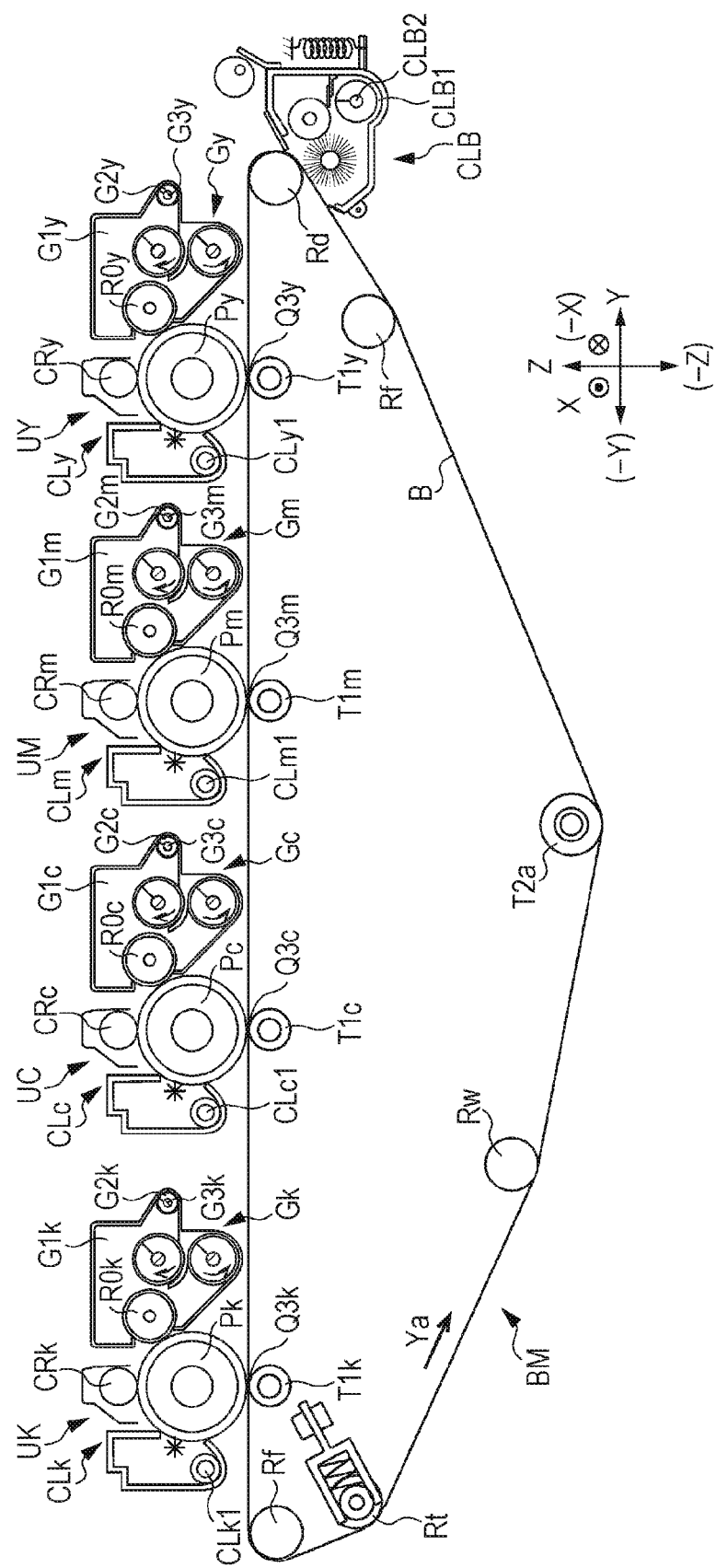
FIG. 2 is an enlarged view of a visible-image forming apparatus according to the first exemplary embodiment.

FIG. 2 is an enlarged view of a visible-image forming apparatus according to the first exemplary embodiment.

In FIG. 1, a copier U as an example of the image forming apparatus has an operable section UI, a scanner section U1 as an example of an image reading device, a feeder section U2 as an example of a medium feeding device, an image forming section U3 as an example of an image recording device, and a medium processing device U4.

Operable Section UI

The operable section UI has input buttons UIa as an example of input portions. The input buttons UIa are used for starting copying, for setting the number of copy sheets, and for setting a document reading method in the scanner section U1. Moreover, the operable section UI has a display UIb that displays the contents input via the input buttons UIa as well as the status of the copier U.

Scanner Section U1

Figure 3:
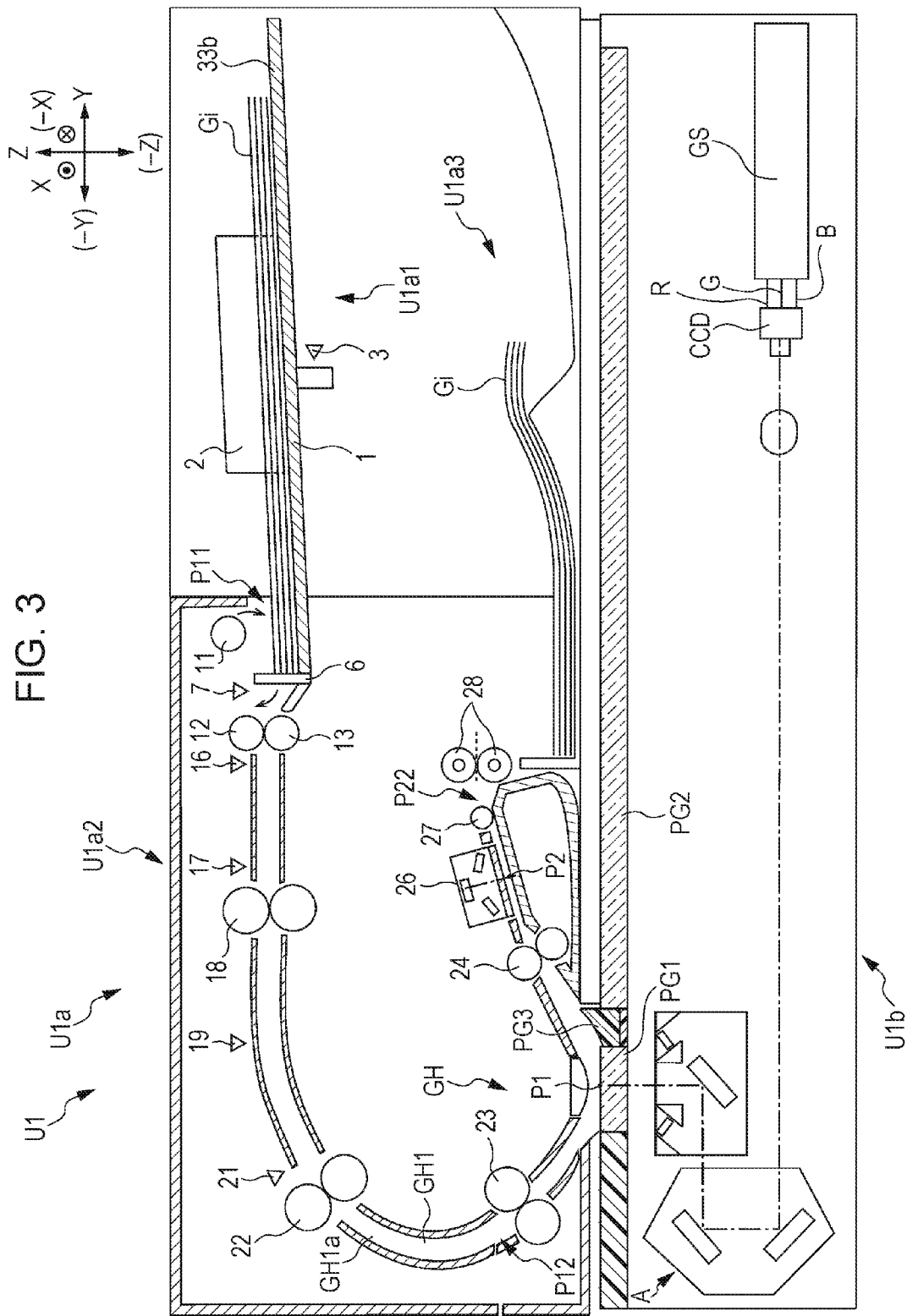
FIG. 3 is an overall view of an image reading device according to the first exemplary embodiment.

FIG. 3 is an overall view of the image reading device according to the first exemplary embodiment.

In FIGS. 1 and 3, the scanner section U1 has a scanner body U1b as an example of an image-reading-device body, which has a transparent document base PG at an upper end thereof. A document transport device U1a is disposed at the upper surface of the scanner body U1b. The document transport device U1a is supported in an openable-closable manner such that it is capable of uncovering and covering the document base PG.

The document transport device U1a has a document feed tray U1a1 as an example of a document load section that accommodates a stack of multiple documents Gi to be copied. A document transport section U1a2 is provided to the left of the document feed tray U1a1. The document transport section U1a2 transports the documents Gi on the document feed tray U1a1 onto the document base PG. A document output tray U1a3 as an example of a document output section is disposed below the document feed tray U1a1. Each document Gi that has traveled over the document base PG is output onto the document output tray U1a3 from the document transport section U1a2.

In FIG. 3, a read window PG1 as an example of a first read surface over which a document travels is disposed at the left end of the document base PG. The read window PG1 is formed in correspondence with a predetermined first-face read position P1 in a transport path of the document transport device U1a. Each document Gi transported by the document transport device U1a travels over the read window PG1. Platen glass PG2 that supports a document Gi set by a user is disposed to the right of the read window PG1. A document guide PG3 as an example of a guide is supported between the read window PG1 and the platen glass PG2. The document guide PG3 guides each document Gi that has traveled over the read window PG1 into the document transport device U1a.

An exposure optical system A is supported inside the scanner body U1b. Reflected light from the document Gi is converted into red (R), green (G), and blue (B) electric signals by a solid-state imaging element CCD as an example of a first reading member via multiple optical members of the exposure optical system A and is input to an image processor GS.

The image processor GS converts the R, G, and B electric signals input from the solid-state imaging element CCD into black (K), yellow (Y), magenta (M), and cyan (C) image information, temporarily stores the image information, and outputs the image information as latent-image-forming image information to a latent-image-forming-device drive circuit D of the image forming section U3 at a predetermined timing.

If a document image is a monochrome image, black (K) image information alone is input to the latent-image-forming-device drive circuit D.

The document base PG, the exposure optical system A, the solid-state imaging element CCD, and the image processor GS constitute the scanner body U1b according to the first exemplary embodiment.

Feeder Section U2

In FIG. 1, the feeder section U2 has feed trays TR1, TR2, TR3, and TR4 as an example of medium containers. Furthermore, the feeder section U2 has, for example, a medium feed path SH1 that fetches a recording sheet S as an example of a medium accommodated in each of the feed trays TR1 to TR4 and transports the recording sheet S to the image forming section U3.

Image Forming Section U3 and Medium Processing Device U4

Referring to FIGS. 1 and 2, in the image forming section U3, the latent-image-forming-device drive circuit D outputs a drive signal to latent-image forming devices ROSy to ROSk of the respective colors based on, for example, the image information input from the scanner section U1. For example, photoconductor drums Py to Pk as an example of image bearing members and charging rollers CRy to CRk are disposed below the latent-image forming devices ROSy to ROSk. Electrostatic latent images are formed on the surfaces of the photoconductor drums Py to Pk by the latent-image forming devices ROSy to ROSk and are developed into toner images as an example of visible images by developing devices Gy to Gk. The developing devices Gy to Gk are supplied with developers from toner cartridges Ky to Kk attached to a developer supplying device U3b. The toner images on the surfaces of the photoconductor drums Py to Pk are transferred onto an intermediate transfer belt B as an example of an intermediate transfer body in first-transfer regions Q3y to Q3k by first-transfer rollers T1y to T1k. After the first-transfer process, the photoconductor drums Py to Pk are cleaned by cleaners CLy to CLk.

An intermediate transfer device BM is supported below the latent-image forming devices ROSy to ROSk. The intermediate transfer device BM has the intermediate transfer belt B as an example of an intermediate transfer member and support members Rd+Rt+Rw+Rf+T2a for the intermediate transfer member. The intermediate transfer belt B is supported in a rotatable manner in a direction indicated by an arrow Ya. A second-transfer unit Ut is disposed below an opposing member T2a. The second-transfer unit Ut has a second-transfer member T2b. The second-transfer member T2b comes into contact with the intermediate transfer belt B so as to form a second-transfer region Q4. The opposing member T2a is in contact with an electric feed member T2c. The electric feed member T2c is supplied with second-transfer voltage with the same polarity as the charge polarity of toners.

A transport path SH2 along which the recording sheet S from the feeder section U2 is transported is disposed below the intermediate transfer device BM. In the transport path SH2, the recording sheet S is transported by a transport roller Ra as an example of a transport member to a registration roller Rr as an example of a transport-timing adjusting member. The registration roller Rr transports the recording sheet S to the second-transfer region Q4 in accordance with the timing at which the toner images on the intermediate transfer belt B are transported to the second-transfer region Q4.

When the toner images on the intermediate transfer belt B pass through the second-transfer region Q4, the toner images are transferred onto the recording sheet S by a second-transfer unit T2. After the second-transfer process, the intermediate transfer belt B is cleaned by an intermediate-transfer-body cleaner CLB. The recording sheet S having the toner images transferred thereon is transported to a medium transport belt BH as an example of a transport member and is then transported to a fixing device F. In the fixing device F, the recording sheet S having the toner images transferred thereon travels through a fixing region Q5 where a heating member Fh and a pressing member Fp come into contact with each other, so that the toner images become fixed onto the recording sheet S.

If the recording sheet S having the toner images fixed thereon is to be output, the recording sheet S is transported from a transport path SH3 to a transport path SH5 in the medium processing device U4. The medium processing device U4 has a curl correcting member U4a that corrects a curl in the recording sheet S, and also has an output member Rh by which the recording sheet S is output onto an output tray TH1. If an image is to be recorded onto the second face of the recording sheet S, the recording sheet S having the toner images fixed thereon is transported from the transport path SH3 to inversion paths SH4 and SH7 and a circulation path SH6 so as to be turned over, and then travels along the medium feed path SH1 so as to be transported again to the second-transfer region Q4. The switching between the transport destinations is performed by switching members GT1 to GT3. A sheet transport path SH is constituted by components denoted by the reference characters SH1 to SH7. Furthermore, a sheet transport device SU according to the first exemplary embodiment is constituted by components denoted by the reference characters SH, Ra, Rr, Rh, SGr, SG1, SG2, BH, and GT1 to GT3.

Document Transport Device

Figure 4:
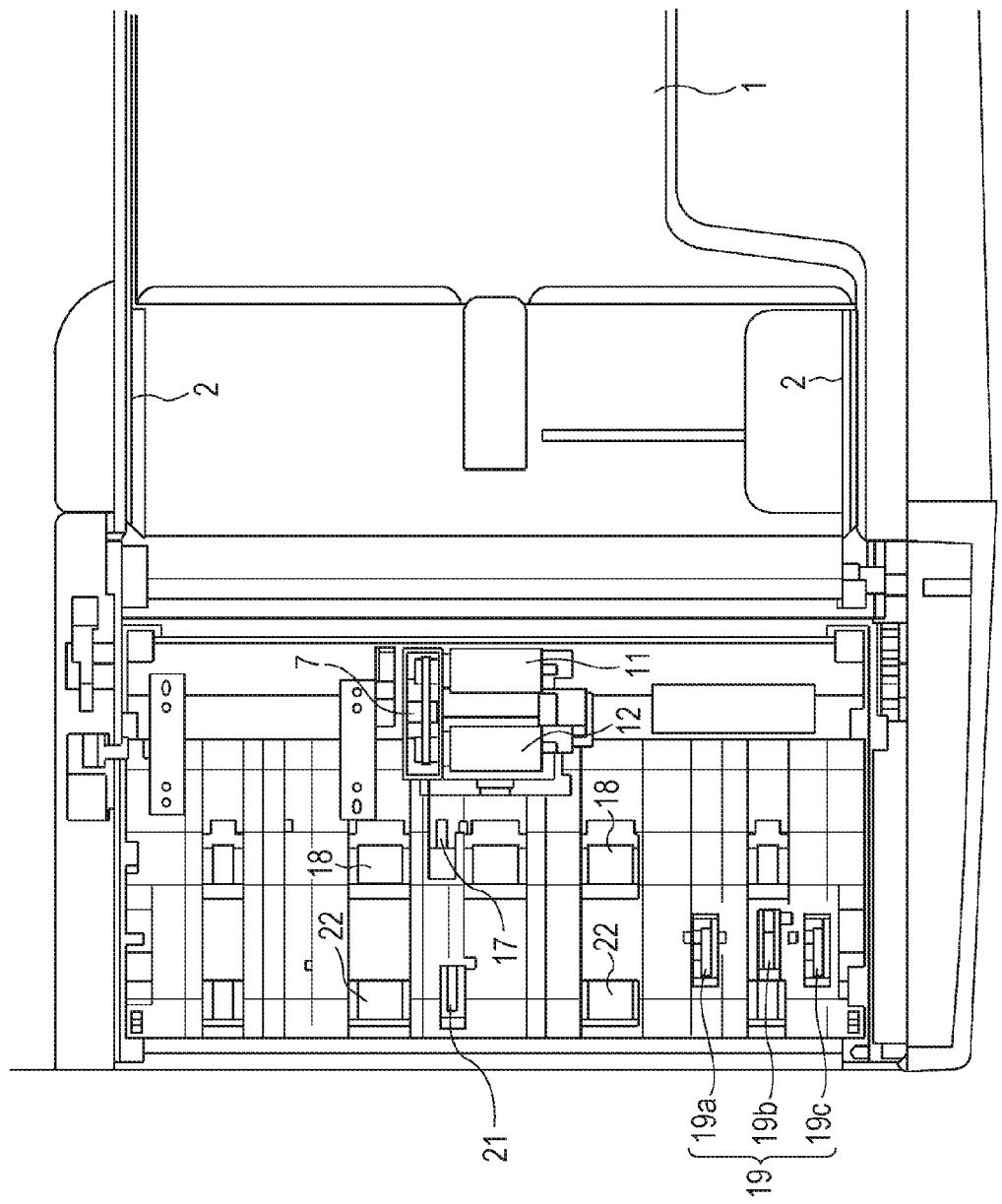
FIG. 4 illustrates the positional relationship of transport members and detection members in a document transport device according to the first exemplary embodiment.

FIG. 4 illustrates the positional relationship of the transport members and detection members in the document transport device U1a according to the first exemplary embodiment.

In FIGS. 3 and 4, the document feed tray U1a1 as an example of a document container has a feed tray body 1 as an example of a load member. The feed tray body 1 has a shape of a plate extending diagonally toward the upper right side.

A side guide 2 as an example of a medium alignment member is supported by a front portion of the feed tray body 1. The side guide 2 is supported in a movable manner in the front-rear direction, that is, the width direction of the documents Gi. The side guide 2 aligns the documents Gi by coming into contact with widthwise edges of the documents Gi. In the first exemplary embodiment, each document Gi is brought into abutment with the rear wall surface of the document feed tray U1a1, and the side guide 2 comes into contact with the ends of the leading edge of the document Gi. Furthermore, the feed tray body 1 supports a tray-width sensor 3 as an example of a fourth detection member. The tray-width sensor 3 detects the widthwise position of the side guide 2, that is, the width of the documents Gi.

A set gate 6 as an example of a medium alignment member is disposed at the left end of the document feed tray U1a1. The set gate 6 is supported in a rotatable manner. Before the documents Gi are transported, the set gate 6 is maintained in a hanging state such that the documents Gi are alignable by bringing the leading edge of the documents Gi in the transport direction into abutment with the set gate 6. When the transporting of the documents Gi commences, the set gate 6 is released and becomes rotatable toward the downstream side, so as not to interfere with the transporting of the documents Gi.

Furthermore, a set sensor 7 as an example of a detection member is disposed at a position displaced from the set gate 6 in the front-rear direction. The set sensor 7 detects the presence or absence of a document or documents Gi abutting on the set gate 6.

A nudging roller 11 as an example of a document fetching member is disposed above the set gate 6 and upstream thereof in the document transport direction. The nudging roller 11 according to the first exemplary embodiment is configured to be ascendable and descendible.

A feed roller 12 as an example of a document transport member is disposed downstream of the set gate 6. A retardation roller 13 as an example of a document separating member is disposed below the feed roller 12 so as to face the feed roller 12.

A feed-in sensor 16 as an example of a detection member is disposed downstream of the feed roller 12 and the retardation roller 13. The feed-in sensor 16 detects the presence or absence of a document Gi.

A feed-out sensor 17 as an example of a first detection member is disposed downstream of the feed-in sensor 16. The feed-out sensor 17 detects the presence or absence of a document Gi.

A take-away roller 18 as an example of a document transport member and also as an example of a skew correcting member is disposed downstream of the feed-out sensor 17.

A document-width sensor 19 as an example of a second detection member is disposed downstream of the take-away roller 18. In FIG. 4, the document-width sensor 19 according to the first exemplary embodiment includes multiple document-width sensors spaced apart in the width direction of the document Gi. Specifically, the document-width sensors 19 include a first document-width sensor 19a disposed at a position corresponding to a B5-size document Gi, a second document-width sensor 19b disposed at a position corresponding to an A4-size document Gi, and a third document-width sensor 19c disposed at a position corresponding to a B4-size document Gi. The document-width sensor 19 according to the first exemplary embodiment is used for detecting a skew of a document Gi based on differences in timings at which the document Gi passes the document-width sensors 19a to 19c.

A preregistration sensor 21 as an example of a third detection member is disposed downstream of the document-width sensors 19. The preregistration sensor 21 detects the presence or absence of a document Gi.

A preregistration roller 22 as an example of a document transport member is disposed downstream of the preregistration sensor 21.

A document registration roller 23 as an example of a document transport member is disposed downstream of the preregistration roller 22. The document registration roller 23 adjusts the timing for transporting a document Gi toward a first-face read position P1.

An out roller 24 as an example of a document transport member is disposed downstream of the document registration roller 23 at a position downstream of the first-face read position P1.

A second-face read position P2 is set downstream of the out roller 24. A read sensor 26 as an example of a second reading member is disposed at the second-face read position P2. The read sensor 26 according to the first exemplary embodiment is a contact image sensor (CIS).

A reading roller 27 as an example of a reading assistance member is disposed downstream of the read sensor 26. An output roller 28 that outputs a document Gi onto the document output tray U1a3 is disposed downstream of the reading roller 27.

Functions of Scanner Body U1b and Document Transport Device U1a

When the scanner body U1b having the above-described configuration is to read an image from a document Gi placed on the platen glass PG2, the exposure optical system A scans the document Gi from the left edge to the right edge thereof. Reflected light from the document Gi is received by the solid-state imaging element CCD, so that the image of the document Gi is read.

When images of documents Gi transported by the document transport device U1a are to be read, the nudging roller 11 descends so as to come into contact with the uppermost surface of the documents Gi. Then, the nudging roller 11 rotates so as to feed the documents Gi. The documents Gi fed by the nudging roller 11 are separated one-by-one by the feed roller 12 and the retardation roller 13. Each separated document Gi is transported to the preregistration roller 22 by the take-away roller 18.

The document Gi transported by the preregistration roller 22 is transported to the first-face read position P1 by the document registration roller 23 in accordance with a predetermined timing. Reflected light from the document Gi passing the first-face read position P1 is received by the solid-state imaging element CCD, so that the image of the document Gi is read. The document Gi that has passed the first-face read position P1 is transported by the out roller 24 to the second-face read position P2. If both faces of the document Gi are to be read, the read sensor 26 reads an image of the second face, which is opposite the first face read by the solid-state imaging element CCD.

In the first exemplary embodiment, when an image is to be read by the read sensor 26, the reading roller 27 retains the document Gi so that the gap between the document Gi and the read sensor 26 may be readily made stable. The document Gi that has passed the second-face read position P2 is output to the document output tray U1a3 by the output roller 28.

Controller According to First Exemplary Embodiment

Figure 5:
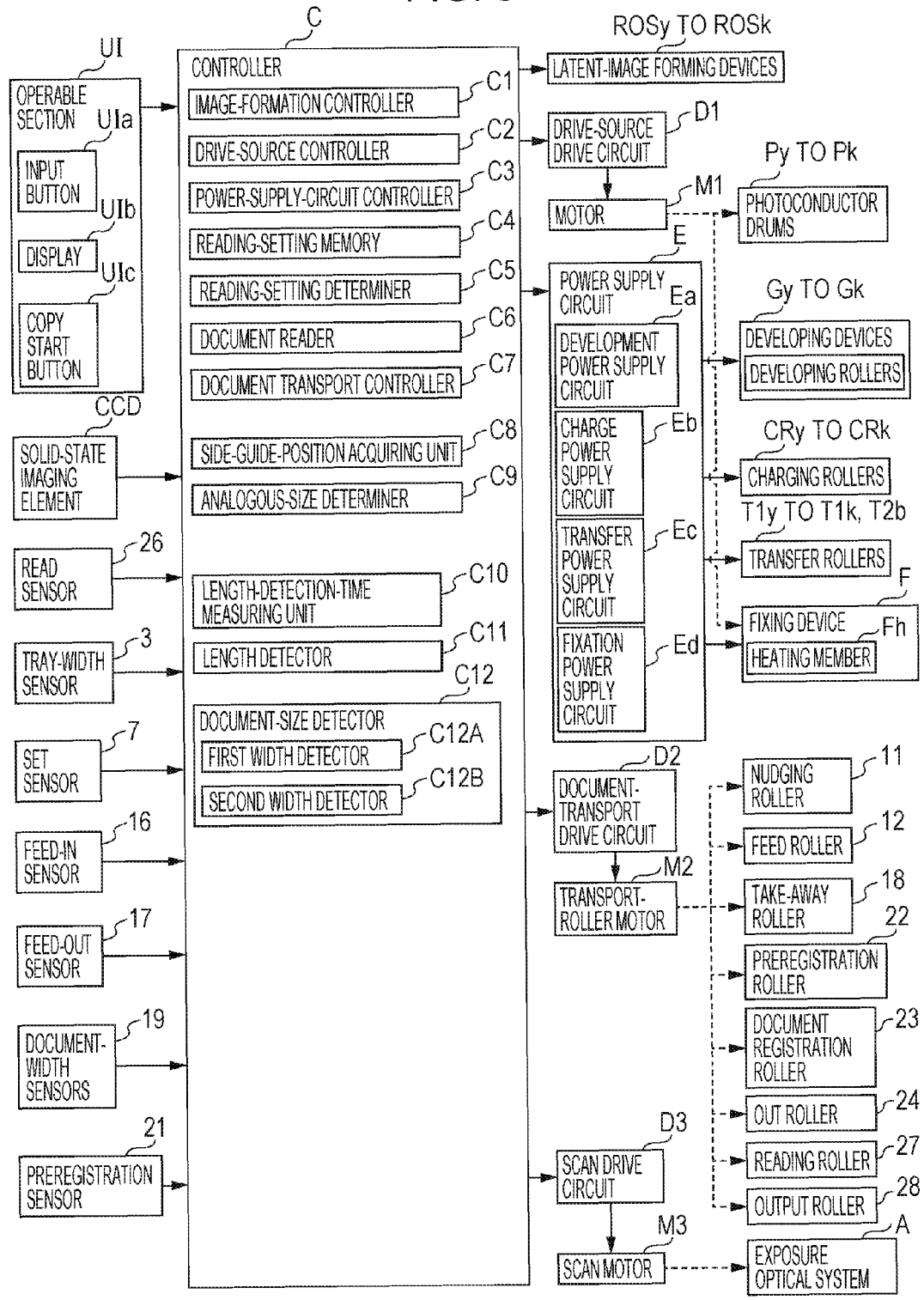
FIG. 5 is a block diagram illustrating functions included in a controller of the image forming apparatus according to the first exemplary embodiment.

FIG. 5 is a block diagram illustrating functions included in a controller of the image forming apparatus according to the first exemplary embodiment.

In FIG. 5, a controller C of the copier U has an input-output interface I/O used for receiving and outputting a signal from and to the outside. The controller C also has a read-only memory (ROM) that stores, for example, programs and information used for performing processes. Moreover, the controller C has a random access memory (RAM) that temporarily stores data. The controller C also has a central processing unit (CPU) that performs a process in accordance with a program stored in, for example, the ROM. Therefore, the controller C according to the first exemplary embodiment is constituted by a small-size information processing device, that is, a so-called microcomputer. Accordingly, the controller C is capable of realizing various functions by executing the programs stored in, for example, the ROM.

Signal Output Components Connected to Controller C

The controller C receives output signals from signal output components, such as the operable section UI, the solid-state imaging element CCD, the read sensor 26, and the sensors 3, 7, 16, 17, 19, and 21.

The operable section UI includes the input buttons UIa, such as a button for inputting the number of print sheets and an arrow button, the display UIb as an example of a notifying member, and a copy start button UIc as an example of an input member for inputting start of a copying operation or a document reading operation.

The solid-state imaging element CCD reads a first-face image of a document Gi.

The read sensor 26 reads a second-face image of a document Gi passing the second-face read position P2.

The tray-width sensor 3 detects the width of a document Gi based on the widthwise position of the side guide 2.

The set sensor 7 detects the presence or absence of a document Gi abutting on the set gate 6.

The feed-in sensor 16 detects the presence or absence of a document Gi in the vicinity of the feed roller 12.

The feed-out sensor 17 detects the presence or absence of a document Gi at the upstream side of the take-away roller 18.

The document-width sensors 19 detect the width of a document Gi.

The preregistration sensor 21 detects the presence or absence of a document Gi at the upstream side of the preregistration roller 22.

Controlled Components Connected to Controller C

The controller C is connected to a drive-source drive circuit D1, a document-transport drive circuit D2, a scan drive circuit D3, a power supply circuit E, and other controlled components (not shown). The controller C outputs control signals to, for example, the circuits D1 to D3 and E.

The drive-source drive circuit D1 rotationally drives, for example, the photoconductor drums Py to Pk as an example of image bearing members and the intermediate transfer belt B via a motor M1 as an example of a drive source.

The document-transport drive circuit D2 as an example of a document-transport-device drive circuit drives a transport-roller motor M2 as an example of a document-transport drive source so as to rotationally drive, for example, the nudging roller 11, the feed roller 12, and the take-away roller 18 disposed in the document transport path GH.

The scan drive circuit D3 drives a scan motor M3 as an example of a scan drive source so as to move the exposure optical system A in the left-right direction along the lower surface of the document base PG via, for example, a gear (not shown).

The power supply circuit E includes a development power supply circuit Ea, a charge power supply circuit Eb, a transfer power supply circuit Ec, and a fixation power supply circuit Ed.

The development power supply circuit Ea applies development voltage to developing rollers of the developing devices Gy to Gk.

The charge power supply circuit Eb applies charge voltage to the charging rollers CRy to CRk so as to electrostatically charge the surfaces of the photoconductor drums Py to Pk.

The transfer power supply circuit Ec applies transfer voltage to the second-transfer member T2b via the first-transfer rollers T1y to T1k and the electric feed member T2c.

The fixation power supply circuit Ed supplies electric power for heating the heating member Fh of the fixing device F.

Functions of Controller C

The controller C has a function of executing processing according to input signals from the signal output components and outputting control signals to the controlled components. Specifically, the controller C has the following functions.

An image-formation controller C1 controls, for example, the driving of each component in the copier U and the voltage application timing in accordance with image information input from the solid-state imaging element CCD or the read sensor 26 of the scanner section U1 so as to execute a job, which is an image forming operation.

A drive-source controller C2 controls the driving of the motor M1 via the drive-source drive circuit D1 so as to control the driving of, for example, the photoconductor drums Py to Pk.

A power-supply-circuit controller C3 controls the power supply circuits Ea to Ed so as to control the voltage to be applied to each component and the electric power to be supplied to each component.

A reading-setting memory C4 stores the settings of a document reading method input from the operable section UI. As a document reading method, the reading-setting memory C4 according to the first exemplary embodiment stores setting information indicating whether the document size is a typical size or an atypical size, setting information indicating whether the document size is the same (i.e., non-mixed-size mode) or includes a mixture of different sizes (i.e., mixed-size mode), and setting information indicating a reading-rate-prioritized mode or a reading-accuracy-prioritized mode. Each piece of setting information is updated in accordance with the input from the operable section UI.

A reading-setting determiner C5 determines the settings of a document reading method related to a job to be executed based on the information stored in the reading-setting memory C4. In the first exemplary embodiment, if there is no input from the operable section UI, the typical-size mode, the non-mixed-size mode, and the reading-rate-prioritized mode are set as a standard reading method.

A document reader C6 reads an image of a document Gi based on an input signal from each of the reading members CCD and 26 when a job is to be executed.

A document transport controller C7 controls the driving of, for example, the nudging roller 11 via the document-transport drive circuit D2 so as to control the transporting of a document Gi.

A side-guide-position acquiring unit C8 as an example of a width detector acquires the widthwise position of the side guide 2 based on a detection result of the tray-width sensor 3. The side-guide-position acquiring unit C8 according to the first exemplary embodiment acquires the position of the side guide 2 when the reading settings are the typical-size mode, the non-mixed-size mode, and the reading-rate-prioritized mode.

An analogous-size determiner C9 determines whether or not the position of the side guide 2 detected by the side-guide-position acquiring unit C8 corresponds to a different document size that is analogous to a preset document width. In the first exemplary embodiment, an A4 short-edge feed (A4-SEF) size and a US-letter size are set as analogous document sizes. Therefore, the A4-SEF size with a document width of 210 mm and the US-letter size with a document width of 215. 9 mm are set as analogous document sizes. In the first exemplary embodiment, if the detected position of the side guide 2, including a margin, corresponds to, for example, a document width ranging between 205 mm and 220 mm, it is determined that the document size is analogous to the A4 size or the US-letter size.

A length-detection-time measuring unit C10 measures a length detection time t1, which is a time period in which the length of a document Gi is detected. The length detection time t1 measured by the length-detection-time measuring unit C10 according to the first exemplary embodiment extends from when the leading edge of the document Gi passes the feed-out sensor 17 as an example of a passing detection member to when the trailing edge of the document Gi passes the feed-out sensor 17. The sensor used is not limited to the feed-out sensor 17 and may alternatively be a sensor that the document Gi passes when being transported, such as the feed-in sensor 16, the document-width sensor 19, or the preregistration sensor 21.

A length detector C11 detects the length of a document Gi in the transport direction thereof based on the length detection time t1 and a preset document transport speed.

FIG. 6 illustrates a list of document-size detection methods according to the first exemplary embodiment.

A document-size detector C12 as an example of a width detector as well as a length detector has a first width detector C12A and a second width detector C12B, and detects the size of a document Gi, that is, the document size. In FIG. 6, if the typical-size mode, the non-mixed-size mode, and the reading-rate-prioritized mode are set in accordance with the document reading settings, the document-size detector C12 according to the first exemplary embodiment detects the document width and the document length, that is, detects the document size, based on the first width detector C12A and the length detector C11. In a case of other reading settings, the document-size detector C12 detects the size from the document width and the document length based on an image read by the solid-state imaging element CCD.

The first width detector C12A detects the document width based on the side-guide-position acquiring unit C8. The first width detector C12A according to the first exemplary embodiment detects the document width when the typical-size mode, the non-mixed-size mode, and the reading-rate-prioritized mode are set. In a case where the typical-size mode, the non-mixed-size mode, and the reading-rate-prioritized mode are set and the analogous-size determiner C9 determines that the document size corresponds to an analogous size, the first width detector C12A according to the first exemplary embodiment is configured not to detect the document width as an exception. In this case, the second width detector C12B detects the document width in place of the first width detector C12A. In the case where the first width detector C12A is to detect the document width in the first exemplary embodiment, a value obtained by the length detector C11 is used as the document length. However, the document length is not limited to the value obtained by the length detector C11 and may alternatively be detected by a sensor (not shown) provided at the document base PG.

The second width detector C12B detects the document width based on an image read by the solid-state imaging element CCD. The second width detector C12B according to the first exemplary embodiment detects the document width when the typical-size mode, the non-mixed-size mode, and the reading-rate-prioritized mode are not set. In a case where the document size corresponds to the aforementioned analogous size, the second width detector C12B according to the first exemplary embodiment is configured such that the second width detector C12B detects the document width as an exception in place of the first width detector C12A. In the case where the second width detector C12B is to detect the document width in the first exemplary embodiment, the document length is detected based on a read image. Alternatively, a value obtained by the length detector C11 may be used as the document length.

Flowchart According to First Exemplary Embodiment

Next, the flow of control performed in the copier U according to the first exemplary embodiment will be described with reference to a flowchart.

Flowchart of Document-Reading Control Process

FIG. 7 is a flowchart of a document-reading control process according to the first exemplary embodiment.

Steps ST in the flowchart in FIG. 7 are performed in accordance with a program stored in the controller C of the copier U. Furthermore, this process is executed concurrently with other various processes in the copier U.

The flowchart shown in FIG. 7 starts when the power of the copier U is turned on.

In step ST1 in FIG. 7, it is determined whether or not a job, such as a copying operation, a scanning operation, or a facsimile transmission operation, has commenced. If yes (Y), the process proceeds to step ST2. If not (N), step ST1 is repeated.

In step ST2, reading-method setting information is acquired. The process then proceeds to step ST3.

In step ST3, it is determined whether or not the typical-size mode is set. If yes (Y), the process proceeds to step ST4. If not (N), the process proceeds to step ST15.

In step ST4, it is determined whether or not the non-mixed-size mode is set. If yes (Y), the process proceeds to step ST5. If not (N), the process proceeds to step ST15.

In step ST5, it is determined whether or not the reading-rate-prioritized mode is set. If yes (Y), the process proceeds to step ST6. If not (N), the process proceeds to step ST15.

In step ST6, the transporting of a document Gi commences. The process then proceeds to step ST7.

In step ST7, the position of the side guide 2 is acquired. The process then proceeds to step ST8.

In step ST8, it is determined whether or not the width of the document Gi corresponds to the width of an analogous size from the acquired position of the side guide 2. If not (N), the process proceeds to step ST9. If yes (Y), the process proceeds to step ST16.

In step ST9, it is determined whether or not the leading edge of the document Gi has passed the feed-out sensor 17 serving as a length detection sensor. Specifically, it is determined whether or not the feed-out sensor 17 has transitioned from a state where the feed-out sensor 17 is not detecting the document Gi to a state where the feed-out sensor 17 is detecting the document Gi. If yes (Y), the process proceeds to step ST10. If not (N), step ST9 is repeated.

In step ST10, the measurement for the length detection time t1 commences. The process then proceeds to step ST11.

In step ST11, it is determined whether or not the trailing edge of the document Gi has passed the feed-out sensor 17 serving as a length detection sensor. Specifically, it is determined whether or not the feed-out sensor 17 has transitioned from a state where the feed-out sensor 17 is detecting the document Gi to a state where the feed-out sensor 17 is not detecting the document Gi. If yes (Y), the process proceeds to step ST12. If not (NO), step ST11 is repeated.

In step ST12, the measurement of the length detection time t1 ends. The process then proceeds to step ST13.

In step ST13, the following processes (1) and (2) are executed, and the process then proceeds to step ST14.

(1) The length of the document Gi in the transport direction thereof is detected from the length detection time t1.

(2) The document size is determined from the width and the length of the document Gi.

In step ST14, it is determined whether or not the job is completed. If yes (Y), the process returns to step ST1. If not (N), step ST14 is repeated.

In step ST15, the transporting of the document Gi commences. The process then proceeds to step ST16.

In step ST16, the reading member CCD or 26 starts reading an image of the document Gi. The process then proceeds to step ST17.

In step ST17, it is determined whether or not the trailing edge of the document Gi has passed the position of the solid-state imaging element CCD, that is, the first-face read position P1 in the first exemplary embodiment. If yes (Y), the process proceeds to step ST18. If not (N), step ST17 is repeated.

In step ST18, the document size is determined from the image read by the solid-state imaging element CCD. The process then proceeds to step ST19.

In step ST19, it is determined whether or not the job is completed. If yes (Y), the process returns to step ST1. If not (N), the process returns to step ST16.

Specific Functions of Scanner Body U1b and Document Transport Device U1a

In the copier U according to the first exemplary embodiment having the above-described configuration, when the copy start button U1c is input in a state where documents Gi are stacked on the document feed tray U1a1, the automatic reading operation is executed. Specifically, each of the documents Gi stacked on the document feed tray U1a1 is fed and transported to the document transport path GH. With regard to each document Gi transported along the document transport path GH, the first face and the second face of the document Gi are read by the solid-state imaging element CCD or the read sensor 26 at the read position P1 or P2.

When a document Gi is to be read in the first exemplary embodiment, the document-size detection method is changed in accordance with the settings of the method for reading the document Gi. Specifically, in a case where the typical-size mode, the non-mixed-size mode, and the reading-rate-prioritized mode are set, the document size is detected from the position of the side guide 2 and the length detection time t1 in which the document Gi passes the feed-out sensor 17. In other cases, the document size is detected from a read image.

If the document size is constantly detected from a read image, as in Japanese Unexamined Patent Application Publication Nos. 2012-039316 and 62-061467, the accuracy for determining the document size is high. However, the document size is not confirmed until the entire page of the document Gi is read. Thus, it takes time to confirm the document size, which is problematic in that a subsequent process, such as a printing process for copying, facsimile transmission, or a scan-data generating process, may be delayed.

In a case where the document width is to be detected from the position of the side guide 2, as in Japanese Unexamined Patent Application Publication No. 2002-165072, the document width and the document length are detected before the entire document Gi is read, that is, during the transporting of the document Gi. Thus, the document size is confirmed earlier than in the case where the document size is detected from a read image. In the case where the document width is to be detected from the position of the side guide 2, if the document width is uncertain, as in the case of an atypical size, the detection accuracy for the document width may be low, which may be caused, for example, when there is play in the side guide 2, when the user excessively brings the side guide 2 into abutment with the document Gi, or when the user does not sufficiently bring the trailing edge of the document Gi into abutment with the wall. In that case, the document size may be falsely detected.

Therefore, in the first exemplary embodiment, when the non-mixed-size mode and the reading-rate-prioritized mode are set, the document size is determined quickly from the position of the side guide 2 and the length detection time t1 of the feed-out sensor 17 if the document is of a typical size. If the document is of an atypical size, the document size is determined accurately from a read image. Accordingly, in the first exemplary embodiment, false detection of the size of the document Gi may be reduced while the reading time of the document Gi may be shortened, as compared with Japanese Unexamined Patent Application Publication Nos. 2012-039316, 62-061467, and 2002-165072.

In the first exemplary embodiment, in a case of an analogous size, such as the A4 size or the US-letter size, the document size is detected from a read image even if the typical-size mode is set. Thus, false detection of the document size may be further reduced, as compared with a case where the document size is detected from, for example, the position of the side guide 2 even in the case of an analogous size.

In the case of the mixed-size mode, there is a mixture of documents having different sizes. In this case, it is difficult to acquire the size of each document Gi from the position of the side guide 2, as in Japanese Unexamined Patent Application Publication No. 2002-165072. In particular, in the configuration described in Japanese Unexamined Patent Application Publication No. 2002-165072, the document-width sensor 19 is used to detect the document size in the case of the typical-size mode and the non-mixed-size mode. However, the document size is undetectable in the case of the atypical-size mode and the non-mixed-size mode, which are not settable as a reading method by the user.

In contrast, in the first exemplary embodiment, the document size detected from the first sheet of document Gi is used until the end of a job in the case of the non-mixed-size mode, and the document size is read from a read image for each sheet of document Gi in the case of the mixed-size mode. Therefore, in the first exemplary embodiment, false detection of the size of the document Gi may be reduced while the reading time of the document Gi may be shortened, as compared with Japanese Unexamined Patent Application Publication Nos. 2012-039316, 62-061467, and 2002-165072. In particular, in the configuration according to the first exemplary embodiment, the document size is determinable in the case of the atypical-size mode and the non-mixed-size mode, while the overall speed may be increased. Supposing that the atypical-size mode and the non-mixed-size mode are set as the standard settings, the document size is confirmed from a read image even if the document Gi is of a typical size. However, when setting the document Gi onto the document feed tray U1a1, the user does not have to securely bring the document Gi into abutment with the rear wall. This allows for improved ease of use and operability for the user.

Furthermore, in the case of the reading-rate-prioritized mode, if the document size is to be determined from a read image, as in Japanese Unexamined Patent Application Publication Nos. 2012-039316 and 62-061467, it takes time until the document size is determined. If the position is to be constantly detected from, for example, the side guide 2, as in Japanese Unexamined Patent Application Publication No. 2002-165072, the document size may be falsely detected unless the trailing edge of the document Gi is brought into abutment with the wall and the side guide 2 is brought into abutment with the leading edge of the document Gi when setting the document Gi onto the document feed tray U1a1.

In contrast, in the first exemplary embodiment, in the case of the typical-size mode and the non-mixed-size mode, the document size is determined from the position of the side guide 2 and the length detection time t1 of the feed-out sensor 17 if the reading-rate-prioritized mode is set, or the document size is determined from a read image if the reading-accuracy-prioritized mode is set. Accordingly, in the first exemplary embodiment, false detection of the size of the document Gi may be reduced while the reading time of the document Gi may be shortened, as compared with Japanese Unexamined Patent Application Publication Nos. 2012-039316, 62-061467, and 2002-165072.

FIGS. 8A to 8C illustrate modifications of the first exemplary embodiment. Specifically, FIG. 8A illustrates a model that only has typical-size and atypical-size setting options, FIG. 8B illustrates a model that only has non-mixed-size and mixed-size setting options, and FIG. 8C illustrates a model that only has reading-rate-prioritized-mode and reading-accuracy-prioritized-mode setting options.

Unlike the first exemplary embodiment, the image forming apparatus in FIG. 8A is of a model that only corresponds to the non-mixed mode and the reading-rate-prioritized mode and has typical-size and atypical-size setting options as reading method settings. In this case, if the typical-size mode is set, the first width detector C12A detects the document size from, for example, the position of the side guide 2. If the atypical-size mode is set, the second width detector C12B detects the document size from a read image. Accordingly, similarly to the first exemplary embodiment, false detection of the size of the document Gi may be reduced while the reading time of the document Gi may be shortened, as compared with the techniques described in Japanese Unexamined Patent Application Publication Nos. 2012-039316, 62-061467, and 2002-165072 in which only one of the document-size detection methods is used.

Similarly to the case in FIG. 8A, the image forming apparatus in FIG. 8B is of a model that only corresponds to the typical-size mode and the reading-rate-prioritized mode and has non-mixed-size and mixed-size setting options as reading method settings. In this model, if the non-mixed-size mode is set, the first width detector C12A detects the document size from, for example, the position of the side guide 2. If the mixed-size mode is set, the second width detector C12B detects the document size from a read image. Accordingly, false detection of the size of the document Gi may be reduced while the reading time of the document Gi may be shortened, as compared with the techniques described in Japanese Unexamined Patent Application Publication Nos. 2012-039316, 62-061467, and 2002-165072.

Similarly to the cases in FIGS. 8A and 8B, the image forming apparatus in FIG. 8C is of a model that only corresponds to the typical-size mode and the non-mixed-size mode and has reading-rate-prioritized-mode and reading-accuracy-prioritized-mode setting options as reading method settings. In this model, if the reading-rate-prioritized mode is set, the first width detector C12A detects the document size from, for example, the position of the side guide 2. If the reading-accuracy-prioritized mode is set, the second width detector C12B detects the document size from a read image. Accordingly, false detection of the size of the document Gi may be reduced while the reading time of the document Gi may be shortened, as compared with the techniques described in Japanese Unexamined Patent Application Publication Nos. 2012-039316, 62-061467, and 2002-165072.

Modifications

Although the exemplary embodiment of the present invention has been described in detail above, the present invention is not to be limited to the above exemplary embodiment and permits various modifications within the technical scope of the invention defined in the claims. Modifications H01 to H010 will be described below.

In a first modification H01, the image forming apparatus according to the above exemplary embodiment is not limited to the copier U, and may be, for example, a facsimile apparatus or a multifunction apparatus having multiple functions of such apparatuses. Furthermore, the above exemplary embodiment is not limited to an electrophotographic image forming apparatus and may be applied to an image forming apparatus of an arbitrary image forming type, such as a lithographic printer of an inkjet recording type or a thermal head type. Moreover, the above exemplary embodiment is not limited to a multicolor image forming apparatus and may be applied to a so-called monochrome image forming apparatus. The above exemplary embodiment is not limited to a so-called tandem-type image forming apparatus and may be applied to, for example, a rotary-type image forming apparatus.

The above exemplary embodiment is applied to the copier U having the scanner section U1 as an example of an image reading device. Alternatively, in a second modification H02, the above exemplary embodiment may be applied to the scanner section U1 alone.

The above exemplary embodiment is applied to the scanner section U1 that is capable of executing the automatic reading operation and the manual reading operation. Alternatively, for example, in a third modification H03, a configuration in which only the automatic reading operation is executable and the manual reading operation is omitted is possible.

In the above exemplary embodiment, the document transport device U1a desirably uses the reading members CCD and 26 to read images of documents Gi at the two read positions P1 and P2. Alternatively, for example, a fourth modification H04 may provide a configuration in which the read sensor 26 is omitted and a document-inverting transport path is provided such that an image of the document Gi is read only at the first-face read position P1, or a configuration that reads only one face of the document Gi.

In the above exemplary embodiment, the typical-size mode or the atypical-size mode, the non-mixed-size mode or the mixed-size mode, and the reading-rate-prioritized mode or the reading-accuracy-prioritized mode are described as examples of reading method settings. Alternatively, in a fifth modification H05, other setting options may be provided. For example, a function for correcting a skew of a document Gi may be provided by bringing the document Gi into abutment with a roller and curving the document Gi by pushing the document Gi from the upstream side. In this case, it is possible to switch between a document-skew correcting mode and a document-skew non-correcting mode by switching between the first width detector C12A and the second width detector C12B, or it is possible to switch between a one-face reading mode and a double-face reading mode, thereby shortening the reading time and reducing false detection.

As a sixth modification H06 of the above exemplary embodiment, the number of sensors and the specific numerical values described as examples of analogous sizes are arbitrarily changeable in accordance with design and specifications.

In the above exemplary embodiment, it is desirable to determine whether the document size corresponds to an analogous size. Alternatively, as a seventh modification H07, for example, only one of the document sizes may be set in a company or country that uses only a specific type of paper.

In the above exemplary embodiment, the side guide 2 is provided only at the front side, which is one of the sides in the document width direction. Alternatively, in an eighth modification H08, the side guide 2 may be disposed at both sides in the document width direction.

In the above exemplary embodiment, the settings for the document reading method are input via the operable section UI. Alternatively, in a ninth modification H09, for example, a value obtained by preliminarily adding a slight error, that is, a margin, to the width of a typical-size document may be stored as a typical-size value. In the case of a typical size, the document width may be determined from the position of the side guide 2 based on a size detection result on the document base, and if the determination result indicates that the document size is not a typical size, the width may be determined from a read image. Accordingly, even when the user unevenly aligns typical-size documents such that the size detection result on the document base and the actual document size are different from each other, the document width may be accurately detected. Moreover, although the operable section UI is used for inputting the typical-size mode or the atypical-size mode, the non-mixed-size mode or the mixed-size mode, and the reading-rate-prioritized mode or the reading-accuracy-prioritized mode, for example, the operable section UI may alternatively be used for only inputting an on or off state of the atypical-size mode. In this case, an active input is not to be performed for the typical-size mode. Likewise, the operable section UI may be used for only inputting an on or off state of the mixed-size mode or an on or off state of the reading-accuracy-prioritized mode.

In the above exemplary embodiment, the document length is detected when detecting the width from a read image. Alternatively, for example, in a tenth modification H010, the document length may be detected using a passing sensor when the width is to be detected from a read image. According to this configuration, the length may be ascertained earlier than when the length is detected from an image.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a tray configured to accommodate at least one document;
   a guide provided in the tray, is supported in a movable manner in a width direction intersecting a transport direction of the document, and is configured to align a widthwise edge of the document;
   an image sensor configured to read an image of the document passing through a read position preset in a transport path; and
   a first sensor configured to detect a width of the document using a widthwise position of the guide if a reading-rate-prioritized mode is selected for the document and is configured to detect the width of the document using the image read by the image sensor in response to the reading-rate-prioritized mode is not selected.

2. An image reading device comprising:
   a tray configured to accommodate at least one document;
   a guide provided in the tray, is supported in a movable manner in a width direction intersecting a transport direction of the document, and is configured to align a widthwise edge of the document;
   an image sensor configured to read an image of the document passing through a read position preset in a transport path;
   a first sensor configured to detect a width of the document using a widthwise position of the guide in response to the document is of a typical size and configured to detect the width of the document using the image read by the image sensor in response to the document is of an atypical size,
   wherein the document is determined to be of the atypical size in response to detecting that the document has a width greater than a maximum width detectable by the first sensor and the guide, and,
   wherein the first sensor is configured to detect the width of the document using the image read by the image sensor in response to the reading-accuracy-prioritized mode is selected for the document even when the document is of a typical size.

3. An image reading device comprising:

a tray configured to accommodate at least one document;

a guide provided in the tray, is supported in a movable manner in a width direction intersecting a transport direction of the document, and is configured to align a widthwise edge of the document;

an image sensor configured to read an image of the document passing through a read position preset in a transport path;

a first sensor configured to detect a width of the document using a widthwise position of the guide in response to the document is of a typical size and configured to detect the width of the document using the image read by the image sensor in response to the document is of an atypical size, wherein the document is determined to be of the atypical size in response to detecting that the document has a width greater than a maximum width detectable by the first sensor and the guide, and, wherein the first sensor is configured to detect the width of the document using the image read by the image sensor in response to the reading-accuracy-prioritized mode is selected for the document even when the at least one document includes a plurality of documents of the same size.

\* \* \* \* \*